(12) United States Patent
Donlagic et al.

(10) Patent No.: US 7,474,821 B2
(45) Date of Patent: Jan. 6, 2009

(54) MANUFACTURING A MICROLENS AT THE EXTREMITY OF A LEAD WAVEGUIDE

(75) Inventors: Denis Donlagic, Maribor (SI); Edvard Cibula, Starse (SI); Éric Pinet, Val-Bélair (CA)

(73) Assignee: Optacore D.O.O., Ljubljana (SI)

( * ) Notice: Subject to any disclaimer, the term of this patent is extended or adjusted under 35 U.S.C. 154(b) by 0 days.

(21) Appl. No.: 11/660,994

(22) PCT Filed: Aug. 25, 2005

(86) PCT No.: PCT/CA2005/001290

§ 371 (c)(1),
(2), (4) Date: Feb. 23, 2007

(87) PCT Pub. No.: WO2006/021093

PCT Pub. Date: Mar. 2, 2006

(65) Prior Publication Data

US 2008/0019639 A1    Jan. 24, 2008

(30) Foreign Application Priority Data

Aug. 25, 2004   (SI) ................................ 200400234

(51) Int. Cl.
*G02B 6/32*    (2006.01)
*B29D 11/00*   (2006.01)
(52) U.S. Cl. ..................... 385/33; 385/35; 264/1.26
(58) Field of Classification Search .............. None
See application file for complete search history.

(56) References Cited

U.S. PATENT DOCUMENTS

| 4,380,365 A | 4/1983 | Gross |
| 5,101,457 A | 3/1992 | Blonder et al. |
| 5,551,968 A | 9/1996 | Pan |
| 5,563,969 A | 10/1996 | Honmou |

(Continued)

FOREIGN PATENT DOCUMENTS

EP    0 430 532    6/1991

(Continued)

OTHER PUBLICATIONS

Babin S. et al., *"Fabrication of a refractive microlens integrated onto the monomode fiber"*, J. Vac. Sci. Technol. B, 1996, pp. 4076-4079, vol. 14, No. 6.

(Continued)

*Primary Examiner*—Tina M Wong
(74) *Attorney, Agent, or Firm*—McDermott Will & Emery LLP

(57) ABSTRACT

Variants of a method for manufacturing a microlens of any desired shape at the extremity of a lead waveguide are provided. A lens element having a non-uniform radial etchability profile is provided at the extremity of the lead waveguide. Preferably, the etchability profile is determined by a non-uniform radial distribution of dopants in the lens element. A spacer may optionally be placed between the waveguide and the lens element. The lens element is then brought down to an appropriate length and etched to its final shape which is mainly determined by the dopant distribution. An optical coupling assembly having a non-uniform radial distribution of dopants therein is also provided.

64 Claims, 10 Drawing Sheets

U.S. PATENT DOCUMENTS

| | | | | |
|---|---|---|---|---|
| 6,814,901 | B2 * | 11/2004 | Itoh | 264/1.38 |
| 7,099,535 | B2 * | 8/2006 | Bhagavatula et al. | 385/33 |
| 2005/0200960 | A1 * | 9/2005 | Tang | 359/619 |

FOREIGN PATENT DOCUMENTS

EP 1 298 460 A1 4/2003

OTHER PUBLICATIONS

Barnard C.W. and Lit J.W.Y., "Single-mode fiber microlens with controllable spot size", Appl. Opt. 1991, pp. 1958-1962, vol. 30, No. 15.

Cohen L.G. and Schneider M.V., "Microlenses for coupling junction lasers to optical fibers", Appl. Opt., 1974, pp. 89 94, vol. 13, No. 1.

Edwards C.A. et al., "Ideal microlenses for laser to fiber coupling"; J. Lightwave Tech., 1993, pp. 252-257, vol. 11, No. 2.

Eisenstein G. and Vitello D., "Chemically etched conical microlenses for coupling single-mode lasers into single-mode fibers", Applied Optics, 1982, pp. 3470-3474, vol. 21, No. 19.

Ghafoori-Shiraz H. and Asano T., "Microlens for coupling a semiconductor laser to a single-mode fiber", Opt. Lett., 1986, pp. 537-539, vol. 11, No. 8.

Hartmann D. M. et al., "Microlenses self-aligned to optical fibers fabricated using the hydrophobic effect", IEEE Phot. Tech. Lett., 2001, pp. 1088-1090, vol. 13, No. 10.

John J. et al., "Matching of single-mode fibre to laser diode by microlenses at 1.5 $\mu m$ wavelength", IEE Proc.-Optoelectron., 1994, pp. 178-184, vol. 141, No. 3.

Kalonji N. and Semo J., "High efficiency, long working distance laser diode to single mode fiber coupling arrangement", Electron. Lett., 1994, pp. 892-894, vol. 30, No. 11.

Kawashi M. and Edahiro T., "Microlens formation on VAD single-mode fibre ends", Electron. Lett., 1982, pp. 71-72, vol. 18, No. 2.

Kim K.R. et al., "Refractive microlens on fiber using UV-curable fluorinated acrylate polymer by surface-tension", IEEE Phot. Tech. Lett., 2003, pp. 1100-1102, vol. 15, No. 8.

Lay T.-S. et al., "1.55-$\mu m$ fiber grating laser utilizing an uncoated tapered hemispherical-end fiber microlens", Jpn. J. Appl. Phys., 2003, pp. 453-455, vol. 42.

Lin G.-R., "Improving the quantum efficiency of erbium-doped fiber laser by using a low-cost tipped fiber splicing process", IEEE Phot. Tech. Lett., 2003, pp. 1201-1203, vol. 15, No. 9.

Minh P.N. et al., "Batch fabrication of microlens at the end of optical fiber using a self-photolithography and etching techniques", Opt. Rev., 2003, pp. 150-154, vol. 10, No. 3.

Modavis R.A. and Webb T.W., "Anamorphic microlens for laser diode to single-mode fiber coupling", IEEE Phot. Tech. Lett., 1995, pp. 798 800, vol. 7, No. 7.

Ozyazici M.S., "Increasing semiconductor laser-optical fiber coupling efficiency by introducing microlens", Opt. Appl., 2004, pp. 185-202, vol. XXXIV, No. 2.

Park E.-H. et al., "Microlens for efficiency coupling between LED and optical fiber", IEEE Phot. Tech. Lett., 1999, pp. 439-441, vol. 11, No. 4.

Presby H.M. et al., "Laser micromachining of efficient fiber microlenses", Appl. Opt., 1990, pp. 2692-2695, vol. 29, No. 18.

Presby H.M. and Edwards C.A., "Near 100% efficient fiber microlens", Electron. Lett., 1992, pp. 582-584, vol. 28, No. 6.

Saitoh A. et al., "Chalcogenide-glass microlenses attached to optical-fiber end surfaces", Opt. Lett., 2000, pp. 1759-1761, vol. 25, No. 24.

Saitoh A. et al., "Chalcogenide-glass microlenses for optical fibers", J. Non-cryst. Solids, 2002, pp. 983-987, vol. 299 302.

Shiraishi K. et al., "A fiber lens with a long working distance for integrated coupling between laser diodes and single-mode fibers", J. Lightwave Tech., 1995, pp. 1736-1744, vol. 13, No. 8.

Shiraishi K. et al., "A lensed-fiber coupling scheme utilizing a graded-index fiber and a hemispherically ended coreless fiber tip", IEEE J. Lightwave Tech., 1997, pp. 358 364, vol. 15, No. 2.

Vassallo C. and M. Van Der Keur, "Ultimate coupling performances for microlensed fibres"; J. Electron. Lett., 1992, pp. 1913-1915, vol. 28, No. 20.

Yang, H.-M. et al., "High-coupling tapered hyperbolic fiber microlens and taper asymmetry effect", Journal of Lightwave Technology, 2004, pp. 1395-1401, vol. 22, No. 5.

Yeh Z.-M et al., "A novel scheme of lensed fiber employing a quadrangular-pyramid-shaped fiber end face for coupling between high-power laser diodes and single-mode fibers", J. Lightwave Tech., 2004, pp. 1374-1379, vol. 22, No. 5.

Zhong et al., "Characterization of the lightguiding structure of optical fibers by atomic force microscopy", Journal of Lightwave Technology, 1994, pp. 1517-1523, vol. 12, No. 9.

* cited by examiner

MANUFACTURING A MICROLENS AT THE EXTREMITY OF A LEAD WAVEGUIDE

RELATED APPLICATIONS

This application is the U.S. National Phase under 35 U.S.C. 0 371 of International Application No. PCT/CA2005/001290, filed on Aug. 25, 2005, which in turn claims the benefit of Slovenian Patent Application No. P 200400234SI, filed on Aug. 25, 2004, the disclosures of which Applications are incorporated by reference herein.

FIELD OF THE INVENTION

The present invention relates to the field of optical microcomponents and more preferably concerns the provision of a microlens at the extremity of a lead waveguide.

BACKGROUND OF THE INVENTION

With the development of micro-optics and all-fiber technologies mainly driven by the telecommunication industry, there is an increased need for miniaturized optics and especially miniaturized optical devices that could be simply assembled with optical waveguides in general and optical fibers in particular. Among those devices, microlenses are of particular interest. The field of microlenses combined with optical fibers is quite extensive and comprises many applications such as: coupling into optical fiber light sources such as laser (Cohen L. G. and Schneider M. V. Appl. Opt. (1974) Vol. 13 n°1, pp. 89 94 "*Microlenses for coupling junction lasers to optical fibers*"; Ghafoori-Shiraz H. and Asano T. Opt. Lett. (1986) Vol. 11 n°8, pp. 537 539 "*Microlens for coupling a semiconductor laser to a single-mode fiber*"; Lin G.-R. IEEE Phot. Tech. Lett. (2003) Vol. 15 n°9, pp. 1201 1203 "*Improving the quantum efficiency of erbium-doped fiber laser by using a low-cost tipped fiber splicing process*"; and Ozyazici M. S. Opt. Appl. (2004) Vol. XXXIV n°2, pp. 185 202 "*Increasing semiconductor laser-optical fiber coupling efficiency by introducing microlens*") or light emitting diodes (Park E.-H. et al. IEEE Phot. Tech. Lett. (1999) Vol. 11 n°4, pp. 439 441 "*Microlens for efficient coupling between LED and optical fiber*"), coupling light detectors with optical fibers, coupling between identical or different types of optical fibers, coupling optical fibers with planar waveguides, coupling optical fibers with other photonic components, various sensor applications, applications in micro-optics etc.

A Variety of microlens designs used in combination with an optical fiber are known in the art. Microlenses are often used to separate components positioned in the vicinity of an optical fiber tip and to perform various functions such as, most often, collimation or focusing of light that enters or exits single-mode or multimode optical fibers. It is known in the art that due to the size and to the shape of such devices, the process of microlens alignment in front of an optical fiber is very complex, always expensive and in many cases an impractical task. Some solutions involving the use of arrays have however been proposed.

Once alignment is performed, microlenses are usually bonded to the optical fibers typically using various specialty adhesives, such as polymeric adhesives. Beside the constraints for selecting such adhesive in relation to their adhesion and optical properties, the main problem of this approach is the mechanical instability of the adhesives with time and temperature, which is unacceptable as microlenses are usually used in devices where positioning is critical. The use of polymeric adhesives is therefore problematic since they have increased temperature dependence and are also susceptible to other environmental factors such as the presence of organic vapors that could make them swell or shrink or modify their optical properties, usually by reducing their light transmission, not mentioning the fact that they are often aging with time and are also frequently degraded by high light power (usually in the short energetic wavelength range) and by high temperature. Some inorganic adhesives such as low melting point solder glasses could alternatively be used for demanding applications, but they have also their limitations and create problems associated with residual thermal stresses. For applications where high light intensity and high temperature could be generated, such as in applications with fiber high power solid state lasers, the use of adhesives for microlens assembly could be in some cases problematic.

Quite few methods described in the literature allow the formation of a microlens at the tip of an optical fiber with a simple and precise positioning of the microlens. Some of them use of a transparent polymer to create a microlens. The polymeric microlens could be for instance shaped by laser beam melting (such as described in U.S. Pat. No. 4,380,365), by photolithography techniques (Minh P. N. et al Opt. Rev. (2003) Vol. 10 n°3, pp. 150 154 "*Batch fabrication of microlens at the end of optical fiber using self-photolithography and etching techniques*"), by dry resist process involving polymerization induced by high energy electrons (Babin S. et al. J. Vac. Sci. Technol. B (1996) Vol. 14 n°6, pp. 4076 4079 "*Fabrication of a refractive microlens integrated onto the monomode fiber*") or more simply by surface tension (Kim K. R. et al. IEEE Phot. Tech. Lett. (2003) Vol. 15 n°8, pp. 1100 1102 "*Refractive microlens on fiber using UV-curable fluorinated acrylate polymer by surface-tension*") or by hydrophobic effects (Hartmann D. M. et al. IEEE Phot. Techn. Lett. (2001) Vol. 13 n°10, pp. 1088 1090 "*Microlenses self-aligned to optical fibers fabricated using the hydrophobic effect*"). Although those polymeric microlenses may have interesting optical properties and advantages, such as for some techniques the possibility of custom surface shaping, their long term use and their temperature resistance is compromised due to the polymeric material used in their design.

A better stability could be obtained if the microlens is composed of glass instead of polymer molecules. Several approaches involving glass microlenses manufacturing have been proposed so far. In some reported methods such as described in patent EP 1 298 460 A1 or in published papers by Modavis R. A. and Webb T. W. IEEE Phot. Techn. Lett. (1995) Vol. 7 n°7, pp. 798 800 "*Anamorphic microlens for laser diode to single-mode fiber coupling*" and Yeh Z.-M. et al. J. Lightwave Tech. (2004) Vol. 22 n°5, pp. 1374 1379 "*A novel scheme of lensed fiber employing a quadrangular-pyramid-shaped fiber end face for coupling between high-power laser diodes and single-mode fibers*", a precise polishing of the end of an optical fiber is performed to create a microlens. Some other reported manufacturing techniques involve laser micromachining of the tip of an optical fiber such as reported in patent EP 0 430 532 or in the published paper by Presby H. M. and Edwards C. A. Electron. Lett. (1992) Vol. 28 n°6, pp. 582 584 "*Near 100% efficient fibre microlens*". Although a precise micromachining allows the shaping of interesting microlens profiles such as hyperbolic shapes, such techniques are complicated and not well suited for low-cost and high volume microlens manufacturing. Another approach described in the literature consists of shaping by heat melting the end of an optical fiber, generally using an arc-discharge fiber splicer, (such as for example described in U.S. Pat. No. 5,563,969 or in published papers by Shiraishi K. et al. J. Lightwave Tech. (1995) Vol. 13 n°8, pp. 1736 1744 "*A fiber lens with a long* working distance for integrated coupling between laser diodes and single-mode fibers"; and Shiraishi K. et al. IEEE J. Lightwave Tech. (1997) Vol. 15 n°2, pp. 358 364 "*A lensed-fiber coupling scheme utilizing a graded-index fiber and a hemispherically ended coreless fiber tip*"). An alternate method using also arc-discharge heating is described in U.S. Pat. No. 5,551,968 where a microlens at the tip of a fiber is formed by jerking apart two fused fibers. For all methods involving shaping or creating the glass microlens with heat, the size of the microlens could in some cases exceed the diameter of the optical fiber and the shape of the microlens is often difficult to control accurately. The main drawbacks of these methods are limited repeatability and time-consuming fabrication process that requires individual machining of each produced microlens.

The use of chemical etching to help creating microstructures is the basis of some of the most important technologies used in the semiconductor industry, such as for instance photolithography. However there are only few examples in the literature applying this concept for shaping glass microlenses at the tip of an optical fiber. For instance interesting papers were published describing how to produce chalcogenide-glass microlenses attached to optical fibers (Saitoh A. et al. Opt. Lett. (2000) Vol. 25 n°24, pp. 1759 1761 "*Chalcogenide-glass microlenses attached to optical-fiber end surfaces*"; and Saitoh A. et al. J. Non-cryst. Solids (2002) Vol. 299 302, pp. 983 987 "*Chalcogenide-glass microlenses for optical fibers*"). In those papers an $As_2S_3$ film, which is first deposited under vacuum at the tip of an optical fiber, is allowed to cross-link under illumination coming from the optical fiber so that the cross-linked area is centered with the fiber core. The film is then etched away using a basic solution with controlled conditions in order to produce a plano-convex chalcogenide-glass microlens. U.S. Pat. Nos. 4,469,554 and 5,800,666 disclose a microlens fabrication method also using chemical etching. The optical fiber, reshaped with chemical etching, has a conical shape with a rounded tip. The fabrication process consists of a precise controlled pulling of an optical fiber out of an etching solution in order to achieve the desired shape of the optical fiber tip. A microlens fiber fabricated by direct etching of a single-mode fiber and then by melting the tip of the fiber was also published (Kawashi M. and Edahiro T. Electron. Lett. (1982) Vol. 18 n°2, pp. 71 72 "*Microlens formation on VAD single-mode fibre ends*"; Barnard C. W. and Lit J. W. Y. Appl. Opt. (1991) Vol. 30 n°15, pp. 1958 1962 "*Single-mode fiber microlens with controllable spot size*"; Lay T.-S. et al. Jpn. J. Appl. Phys. (2003) Vol. 42, pp. 453 455 "*1.55-μm fiber grating laser utilizing an uncoated tapered hemispherical-end fiber microlens*").

In the literature, most of the microlenses are directly assembled at the tip of an optical fiber. However there are few examples where a spacer is used to optimize the optical properties of the microlens. In one paper (Kalonji N. and Semo J. Electron. Lett. (1994) Vol. 30 n°11, pp. 892 894 "*High efficiency, long working distance laser diode to single mode fibre coupling arrangement*") a section of graded index multimode fiber (GRIN MMF) is fused to a single-mode fiber and a suitable amount of glass is heat deposited on the spacer and is finally heat shaped into a microlens. In another paper (Kim K.-R. et al. IEEE Phot. Tech. Lett. (2003) Vol. 15 n°8, pp. 1100 1102 "*Refractive microlens on fiber using UV-curable fluorinated acrylate polymer by surface-tension*") a coreless silica fiber (CSF) is used as a spacer between the single-mode fiber and the polymeric microlens.

A different chemical etching technique is disclosed in a paper of G. Eisenstein and D. Vitello (Applied Optics (1982) Vol. 21 n°19, "*Chemically etched conical microlenses for coupling single-mode lasers into single-mode fibers*") where a selective etching of the optical fiber tip is used. The HF acid buffered with $NH_4F$ is used as etchant where the etching rate of $GeO_2$ doped core is lower than the etching rate of pure silica cladding. Different etching rates result in formation of a conical pike at the tip of an optical fiber that acts as a microlens. The shape and radius of microlens is therefore determined by profile of the single-mode lead optical fiber. The authors mentioned that the cone could be reshaped to a hemispherical microlens by fire polishing or arc melting. They also showed a slight increase of coupling efficiency between a fiber with a microlens and a laser diode, but the technique remained undeveloped and it does not allow for the realization of a microlens with arbitrary size and appropriate quality.

In view of the above, there is still a need for a versatile, efficient and commercially viable technique for providing a microlens at the extremity of a lead fiber or other waveguide.

SUMMARY OF THE INVENTION

In view of the above, and according to a first aspect of the present invention, there is provided a method for manufacturing a microlens having a desired shape at an extremity of a lead waveguide, the method including the steps of:
  a) positioning a first end of an elongated optical structure in end to end alignment with the extremity of the lead waveguide, said optical structure having a second end opposite said first end, said second end having a radially non-uniform etchability profile selected to define said desired shape;
  b) permanently joining the first end of the optical structure to said extremity of the waveguide; and
  c) processing the second end of the optical structure to obtain said microlens, said processing comprising the substeps of:
    i. adjusting a length of said optical structure; and
    ii. etching said second end of the optical structure to obtain said desired shape.

Preferably, the optical structure includes a spacer portion at the first end and a lens portion at the second end. They may form together a monolithic block, or the optical structure may be manufactured prior to step a) by performing the substeps of:
  i. positioning a spacer element in end to end alignment with a lens element, said lens element being provided with said etchability profile;
  ii. permanently joining said lens element to said spacer element; and
  iii. adjusting a length of said spacer element.

Alternatively, the present invention provides the following method for manufacturing a microlens having a desired shape at an extremity of a lead waveguide:
  a) positioning a first end of an elongated spacer element in end to end alignment with the extremity of the lead waveguide;
  b) permanently joining the first end of the spacer element to said extremity of the waveguide;
  c) processing a second end of the spacer element opposite the first end to adjust a length thereof;
  d) positioning a first end of an elongated lens element in end to end alignment with the second end of the spacer element, said lens element having a second end opposite the first end, said second end having a radially non-uniform etchability profile selected to define said desired shape;

e) permanently joining the first end of the lens element to said second end of the spacer element; and
f) processing the second end of the lens element to obtain said microlens, said processing comprising the substeps of:
   i. adjusting a length of said lens element; and
   ii. etching said second end of the lens element to obtain said desired shape.

In accordance with another aspect of the invention, there is provided a light coupling assembly, including:
   a lead waveguide having a coupling extremity;
   an optical structure having opposite first and second ends, the first end being permanently joined to the coupling extremity of the waveguide, and the second end being shaped as a microlens of a generally continuous profile, said second end having a radial distribution of dopants therein following a generally continuous gradient profile.

Advantageously, the present invention and its preferred embodiments provide unique and low-cost manufacturing processes allowing the assembly and the shaping of microlenses of a variety of designs.

Other features and advantages of the present invention will be better understood upon reading of preferred embodiments thereof with reference to the appended drawings.

DESCRIPTION OF PREFERRED EMBODIMENTS OF THE INVENTION

Figure 1A:
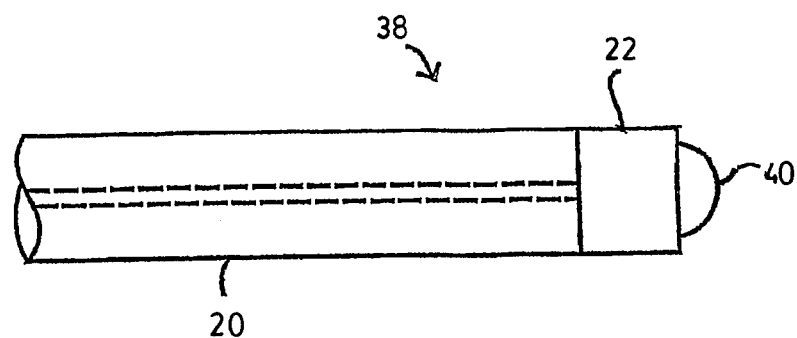
FIG. 1A is a schematical side view of an optical assembly according to a first preferred embodiment of the invention, the assembly including a lead fiber, a spacer and a microlens.

In the following description, similar features in the drawings have been given similar reference numerals and in order to weight down the figures, some elements are not referred to in some figures if they were already identified in a precedent.

The present invention first provides various methods for the fabrication of a microlens at an extremity of a lead waveguide. As will be apparent from the description below, the present method may be used to produce a resulting microlens of any one of a variety of desired shapes.

For convenience, throughout the present specification, the various embodiments of methods and assemblies according to the invention will be described using an optical fiber as the lead waveguide. It is however understood that the present invention may be easily adapted to planar or other types of wave guiding structures from which light may need to be coupled, and that such devices are clearly considered within the scope of the present invention.

The methods according to the, preferred embodiments of the invention uses the principle of selective etching occurring preferably in composite glass or other light transparent inorganic materials such as for instance sapphire, diamond or the like, when etched in an appropriate medium. As known in the art (Eisenstein G. and Vitello D., Applied Optics (1982) Vol. 21 n°19, "*Chemically etched conical micro-lenses for coupling single-mode lasers into single-mode fibers*"), when doped silica glass is etched in for example hydrofluoric acid (HF) or buffered HF acid (BHF) the etching rate of the glass depends on glass composition. For example, if the pure $SiO_2$ glass is doped with $GeO_2$ or $TiO_2$ the etching rate in HF acid is proportional to dopant concentration. If the HF is replaced by proper BHF (e.g. HF buffered in ammonium fluoride) the etching rate decreases proportionally with the dopant concentration. The invention goes beyond the teachings of Eisenstein and Vitello and uses the same effect to achieve arbitrary shapes and sizes of the microlenses created at the tip of a waveguide such as an optical fiber.

A first embodiment of a manufacturing method based on this principle is shown in FIGS. 5A to 5E.

Figure 5A:
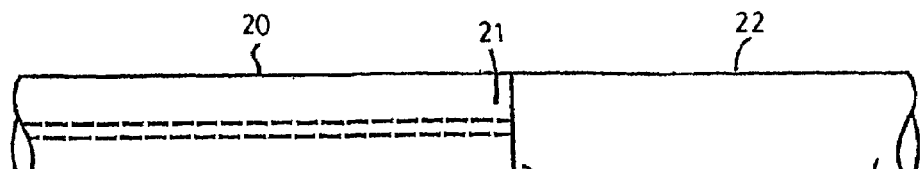
FIGS. 5A to 5E illustrate the steps of a method which may be used to fabricate the optical assembly shown in FIG. 1 or in FIG. 4, according to a preferred embodiment of the invention.

Referring to FIG. 5A, an elongated spacer element 22 is first positioned in end-to-end alignment with the extremity 21 of a lead fiber 20. The spacer element 22 may be embodied by a coreless fiber, another type of fiber or glass rod which may be doped or undoped. A first end 24 of the spacer element 22 is permanently joined to the extremity 21 of the lead fiber 20, preferably by fusion splicing or alternatively by another appropriate process such as heat splicing, direct bonding or anodic bonding, depending on the particular application.

Figure 5B:
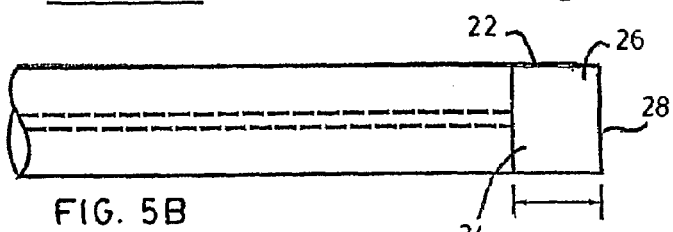

Referring to FIG. 5B, the opposite second end 26 of the spacer element 22 is then reduced in length to create a spacer of the targeted length. To this effect, any appropriate technique such as cleaving, mechanical or chemical polishing or combinations thereof may be used. The resulting end surface 28 of the spacer element 22 may be further processed as needed to improve its quality.

Figure 5C:
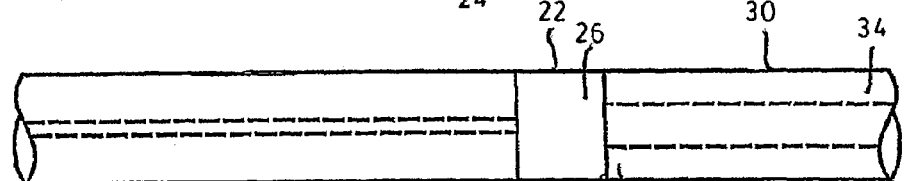

Referring to FIG. 5C, in the following step, an elongated lens element 30 is positioned in end to end alignment with the second end 26 of the spacer element 22 and its first end 32 is permanently joined thereto, again by fusion splicing or another appropriate process. The second end 34 of the lens element 30 has a radially non-uniform etchability profile selected to define the desired shape of the microlens, as will be explained in more detail further below. The lens element 30 is preferably made of an inorganic material and is preferably embodied by a rod of doped glass or a segment of optical fiber. In such a case, the etchability profile is preferably achieved through the provision of a gradient dopant distribution in the radial direction. It will be understood that the expression "radial" is used herein in a large sense to generally describe the crosswise, as opposed to longitudinal direction of the device, and that it is not intended to limit the scope of the invention to lens elements having a circular cross-section.

Figure 5D:
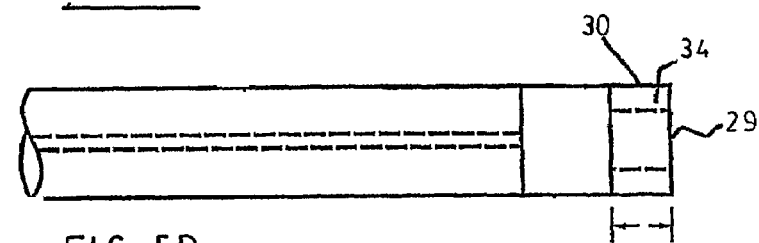

The second end 34 of the lens element is then processed to obtain the microlens of the desired shape. Referring to FIG. 5D, the length of this second end 34 is first adjusted by cleaving, polishing or otherwise to a length that will later determine the length of the microlens. In order to precisely set the length of the lens element a precise mechanical cleaver (such as scribe and break or ultrasonic standard cleavers, or advantageously a $CO_2$ laser cleaver) could be used. Alternatively an optional extra step of polishing the end surface 29 of the lens element 30 could be performed using techniques known in the art such as mechanical polishing of the fiber assembly, as it is preferably maintained in a ferrule perpendicular to a polishing surface. It is worth mentioning that the final length of the microlens is generally less or equal than the length of the lens element obtained from this step.

Figure 5E:
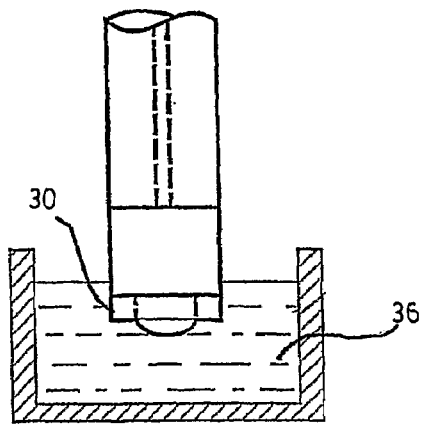

Referring finally to FIG. 5E, the lens element 30 is then etched with an appropriate etching medium 36, which could be in liquid or gaseous phase, and with appropriate conditions (such as pressure and temperature) to obtain the desired microlens shape. Through this process, outer portions of the lens element are selectively removed according to an etching rate determined mainly by the etchability profile of the lens element. The final shape of the microlens is therefore a result of the radial dopant distribution, in combination with the effect of etching time and the type of etching agent.

The surface quality of the etched microlens depends, mainly on the quality of the radial doping profile of the lens element. When the doped fiber or rod are produced by process that relies on individual glass layer deposition and vitrification such as modified chemical vapor deposition (MCVD) or plasma assisted chemical vapor deposition (PCVD), the quality is determined by the thickness of individually deposited and vitrified layers. Using thinner layers, especially in MCVD, therefore results in higher final surface quality. Outside vapor deposition (OVD) or vertical axial deposition (VAD) that use post deposition consolidation process to achieve glass vitrification shall in general produce fibers or rods that will etch with more uniform microlens surfaces. In most cases, these fluctuations are small, at sub-wavelength level and are not limiting. However such surface fluctuations can be further reduced preferably by electric arc heating or by fire melting of the microlens surface, or with further polishing with a polishing liquid or using similar surface treatment procedure.

According to a preferred embodiment of the invention, the lens element is preferably made of silica ($SiO_2$) glass that is doped with one or more dopants in a way that the concentration of dopants varies in the radial direction of fiber. The dopant concentration can be the highest or the lowest in the center of the fiber since etching agents can be found that either etch faster doped or undoped regions. For example, when the $SiO_2$ based fiber is doped with $GeO_2$ or $TiO_2$ and the HF acid is used as an etching solution, the concentration of dopants may be higher in the outer region of the fiber or rod than in the center of fiber to assure the fastest etching of the outer region and creation of convex structure at the tip of the etched rod or fiber, if such is the desired result. Alternatively, it is possible to apply doping where $GeO_2$ or $TiO_2$ concentration is the highest in the center of the fiber and then decreases towards the rod or fiber edges. In this case, the buffered HF can be applied (for instance 1 part of 40% HF acid, buffered with 10 parts of 40% $NH_4F$) as etching medium. Properly buffered HF will etch regions with lower concentration of $GeO_2$ or $TiO_2$ at higher rate and thereby a convex shape will be formed in places of higher doping, e.g. near the center of the fiber or glass rod. It should be noted that more than one dopant can be used to produce fiber or glass rod that is etched as well as variety of combinations of dopants and etching agents, also gaseous agents, can be applied to produce the described microlenses.

Advantageously, the control of the radial distribution of dopants in etched lens element and of etching time and conditions therefore allows the precise control over the final shape of the microlens, while the size of the gradient doped region mainly determinates the radial dimension of the microlens. It is possible to use fiber or glass rod with asymmetrical distribution of dopants, e.g. an elliptical distribution. This allows for well-controlled manufacturing of circularly non-symmetric microlens created at the tip of the fiber that is an important and unique advantage of the present invention.

Figure 1B:
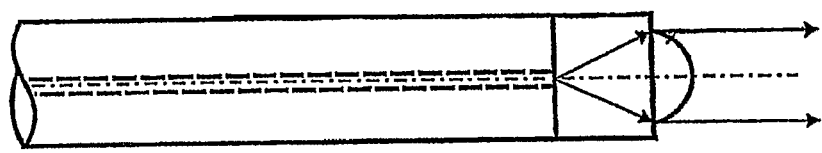
FIG. 1B is a view similar to FIG. 1A illustrating a possible propagation of light in such an assembly.

FIG. 1A shows a light coupling assembly according to an embodiment of the invention which may be obtained through the method of FIGS. 5A to 5E described above. The resulting assembly 38 includes the lead optical fiber 20, the spacer 22 and the microlens 40 obtained from the processing of the lens element. The microlens 40 is preferably fusion spliced to the spacer 22 and the spacer 22 is preferably fusion spliced to the lead fiber 20. The bonding between the spacer and the lead fiber can utilize other methods known in the art. The configuration of the assembly 38 shown in FIG. 1 may be used to provide various optical properties such as, but not limited to, light collimating, light focusing improving coupling efficiency between various optical sources, detectors, optical fibers or other waveguides.

The spacer 22 that separates the microlens and the lead fiber is in the simplest and also most preferred case made preferably of pure silica ($SiO_2$) glass or other composite glass having a uniform radial distribution of dopants. Such a preferably uniform spacer provides optically a neutral separation between the tip of the lead fiber and the microlens. This configuration is advantageous for applications like collimation or focusing where the microlens and the tip of the fiber need to be separated by an exact predetermined distance, while the space between the microlens and the fiber tip contains only optically homogenous material that does not posses any index variations. In most simplistic, geometrical optical model description, the spacer may be used to position the fiber tip is at the focal point of the microlens, for example when collimation is the desired function of the microlens. This case is particularly illustrated in FIG. 1B. Preferably, to best accommodate the target optical applications, due to small dimensions and pronounced diffraction phenomena, the optimum dimensions of the spacer and the microlens should be determined theoretically and/or numerically by a modeling approach that takes into account the wave nature of the light. Commercially available optical design and optimization computer software tools (for example beam propagation method tools) can be used for this purpose.

Alternatively, more complex forms of spacer are also possible. The spacer may for example have an optically non-homogenous structure. For example, its refractive index could vary in either the radial or axial directions or both. Such an inhomogeneous structure may simply be achieved by doping the material used for the spacer element using any appropriate technique known to persons skilled in the art of optical fiber production, or in some instances the spacer can be build out of an optical fiber already having an appropriate refractive index distribution (such as a fiber with graded index profile). This distribution can be also circularly symmetric or non-symmetric. The use of such a complex spacer might be advantageous in more complex optical assemblies. Again numerical modeling shall be applied in such cases to optimize the spacer and microlens dimensions and refractive index distribution of the spacer of the light coupling assembly.

Finally a step index optical fiber with a core preferably larger than microlens diameter can be used to produce the spacer. Such a spacer would have properties that are practical identical to the properties of homogeneous spacer.

Since the selective etching used to shape and produce the microlens relies mainly on variable radial distribution of dopants, the resulting refractive index profile of the microlens consequently usually follows the same dopant distribution, meaning that the microlens is not optically uniform and that its refractive index also varies in its radial direction. Such a variation of the refractive index in the microlens structure may in some cases be an undesired side effect, but in others could advantageously be used in the optical design in order to orient or confine the light to selected areas of the diopter, for instance to correct or induce possible chromatic aberrations when multiple wavelengths are used. Other interesting optical properties such as the birefringence created by a non isotropic dopant distribution could also be used for special applications.

In a lot of cases where the variation of refractive index is an undesired side property, its effect can be neglected as optical effects arising from this radial index non-uniformity of the microlens are usually small, and as the microlenses are mostly used in the air where the refractive index contrast between the microlens and the air is large compared to the variation of index produced by the doping. Moreover, this side effect can be taken into account during theoretical/numerical design and optimization of entire microlens assembly and can be even turned into advantage in certain applications.

Furthermore, it is worth mentioning that when at least two dopants are used to produce the doped fiber or solid rod that is converted into the microlens by etching, the radial variations of refractive index can be entirely removed. For example the lens element may be simultaneously doped with a dopant that increase refractive index (for example $GeO_2$) and another dopant that decreases the refractive index (for example fluorine) so that the net change of the refractive index is zero, while the doping level of both dopants varies in radial direction. Application of at least two appropriate dopants can therefore results in an optically homogenous microlens while preserving a good control over the etching rate in the radial direction of the lens element. This concept may actually be extended further by using different types of dopants to custom-design the final refractive index profile in the microlens to any desired shape. The present invention is therefore particularly versatile as it may be used to control relatively independently both the resulting shape and refractive index of the microlens.

The exact dimensions of the spacer and microlens shape depend on target application and wavelength(s) and may be determined by numerical optimization using appropriate numerical modeling tools. Typical spacer length is in the range between 1 and 500 µm. The microlens diameter usually ranges from the single-mode fiber core size, e.g. 8 µm to a few hundred micrometers, typically up to 500 µm. In many cases this size will however remain below the diameter of the standard optical fiber, e.g. 125 µm. The microlens height, that is, its length along the longitudinal direction, also determines its optical properties and depends on assembly application and initial microlens diameter and can be typically between 1 µm and 250 µm, but other dimensions are also possible.

Figure 8A:
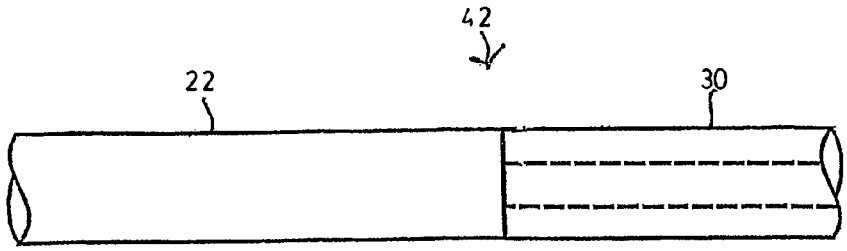
FIGS. 8A to 8E illustrate an alternative preferred method to fabricate the optical assembly shown in FIG. 1 or in FIG. 4.
Figure 8B:
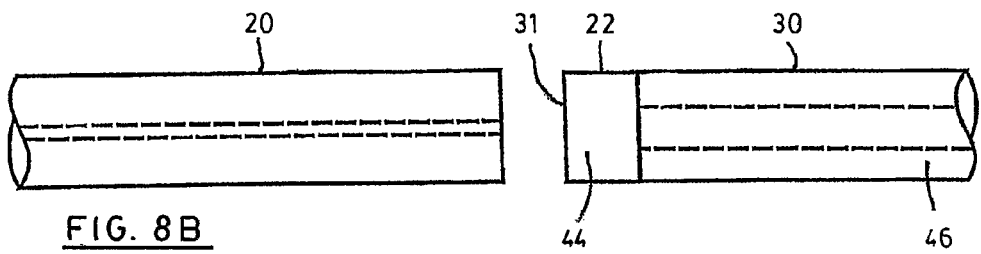

Referring to FIGS. 8A to 8E, there is shown an alternative method to obtain the same resulting device as obtained from the method of FIGS. 5A to 5E, which basically corresponds to performing the same steps in a different order. In this embodiment the spacer element 22 and lens element 30 are joined together before being attached to the lead fiber 20. As with the previous embodiment, the spacer element has a non-uniform etchability profile, for example from a non-uniform dopant distribution. As illustrated in FIG. 8A, the method according to this particular embodiment includes a first step of making an optical structure 42 by positioning the spacer element 22 and lens element 30 in end to end alignment, and permanently joining them through fusion splicing or another appropriate technique. Then the length of the spacer element 22 is adjusted as shown in FIG. 8B, by cleaving, polishing or otherwise processing its end opposite the lens element. Its end surface 31 is preferably properly faced for assuring good splicing using already described possible methods. The resulting optical structure 42 therefore has a first end 44 defining a spacer portion and a second end 46 defining a lens portion.

Figure 8C:
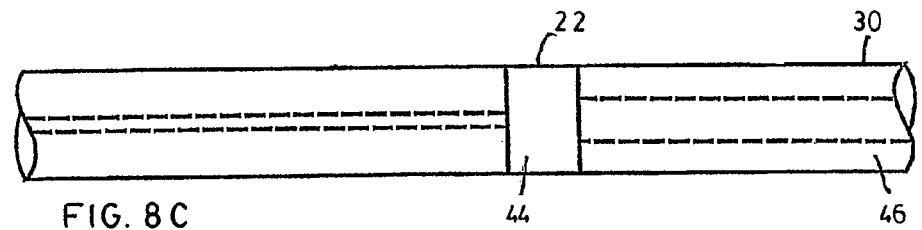
Figure 8D:
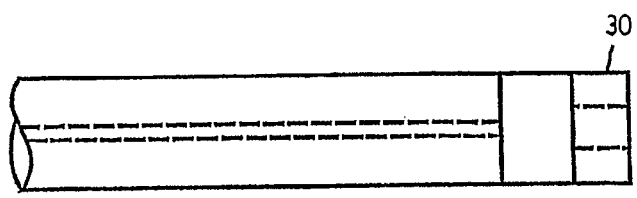
Figure 8E:
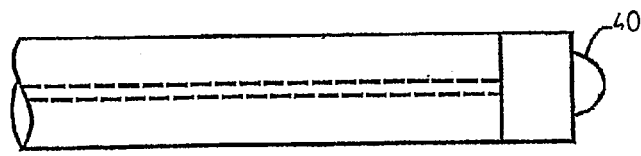

At this stage the first end 44 of the optical structure 42, corresponding to the spacer element 22, is fusion sliced or otherwise permanently joined to the lead fiber as shown in FIG. 8C. The second end 46 of the optical structure, corresponding to the lens element 30 is then processed to obtain a microlens of the desired shape as described above. The length of the lens element 30 is adjusted as shown in FIG. 8D, and the microlens 40 is shaped with chemical etching as shown in FIG. 8E. The final result is exactly the same than previously described method and normally both methods are equivalent. However this approach may be preferred if difficulties for splicing are obtained with the other method, especially at the second splicing. Another advantage of this alternative method could be obtained if the spacer and lens elements have a diameter different (preferably smaller) than the diameter of the lead fiber.

Figure 6A:
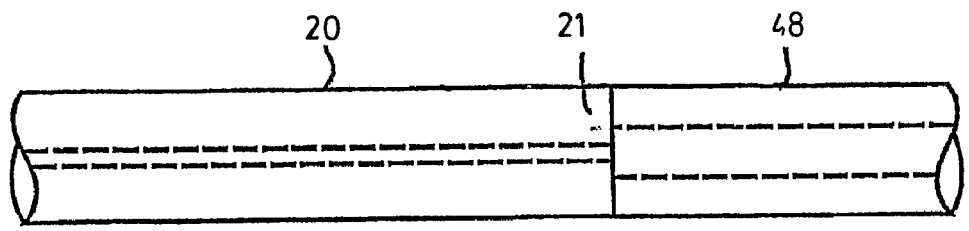
FIGS. 6A to 6C illustrate the steps of a method which may be used to fabricate the optical assembly shown in FIG. 2, according to a preferred embodiment of the invention.
Figure 6B:
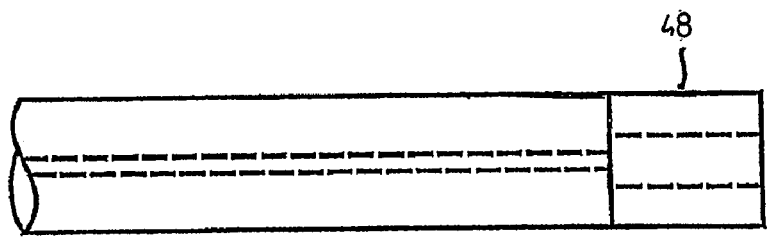
Figure 6C:
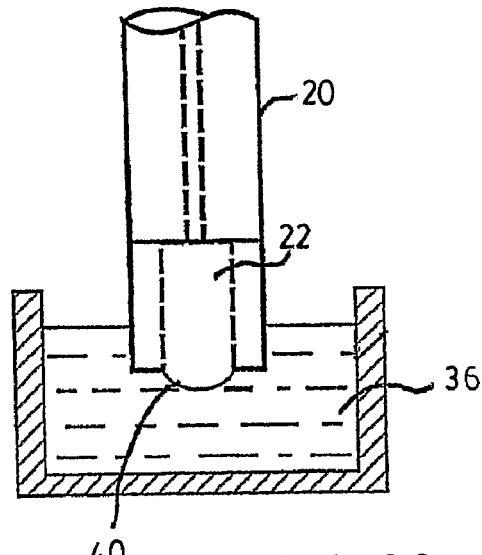

The method according to the embodiment of FIGS. 8A to 8E may be simplified when the spacer element can have the same composition as the lens element. In such a case, shown in FIGS. 6A to 6C, the optical structure may be embodied by a single section incorporating both the spacer portion and the lens portion, thereby creating a monolithic structure at the extremity of the lead fiber. The monolithic block may for example be embodied by a rod of composite glass or a doped fiber. The embodiment of FIGS. 6A to 6C is advantageous since it reduces the number of required splices to a single splice or bonding procedure. The main disadvantage of this method is however that the resulting spacer has the same variable radial distribution of dopants that is used for the creation of microlens by selective etching. The doping profile needed to create the microlens however usually modifies the refractive index of the spacer in its radial direction and thereby changes propagation properties of the light that is transmitted through spacer. This effect can be compensated in some applications by proper shaping of the microlens while in others it can present a limiting factor.

To overcome this problem at least two dopants can alternatively be used to produce an optical structure having a radially independent (or preferably depended) refractive index profile. The optical structure can be simultaneously doped with one dopant that increase refractive index (for example $GeO_2$) and another dopant that decreases the refractive index (for example fluorine) so that the net change of the reactive index is zero, while the doping level of both dopants varies in radial direction. Application of at least two appropriate dopants can therefore result in optically homogenous monolithic structure while allowing proper reshaping of the structure into targeted microlens shape. As explained above, use of two or more different types of dopants may also be used to custom-design the refractive index profile in the microlens and/or in the spacer to any desired shape.

Referring to FIG. 6A, the method of the present embodiment first includes a step of positioning an optical structure forming a monolithic block 48 as described above in end to end alignment with the extremity 21 of the lead fiber 20, and joining them together permanently through fusion splicing or otherwise. As seen in FIG. 6B, the length of the monolithic block 48 is then adjusted through cleaving, polishing or otherwise. The resulting structure is then etched in an appropriate etching medium 36 as shown in FIG. 6C, until the desired microlens 40 and spacer 22 are obtained at the extremity of the lead fiber 20. Other details and variants of the process are identical as in the manufacturing methods described in the previous sections.

Figure 2:
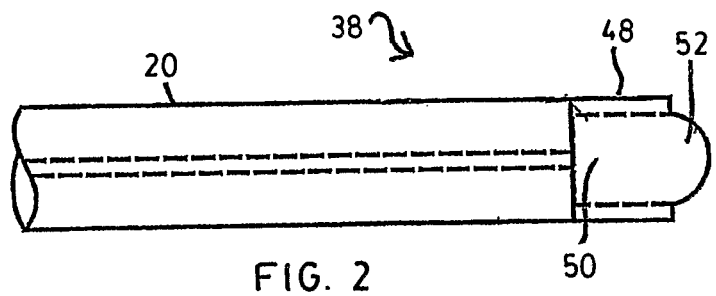
FIG. 2 is a schematical side view of an optical assembly according to a second preferred embodiment of the invention, the assembly including a lead fiber and a monolithic structure defining a spacer and a microlens.

An example of an optical coupling- assembly 38 obtained through the method of FIGS. 6A to 6B is shown in FIG. 2. The assembly in question includes a lead optical fiber 20 and a monolithic block optical structure 48, preferably made of glass, and defining a spacer portion 50 and a lens portion 52. The monolithic optical structure 48 is preferably fusion spliced to the lead fiber. The bonding between the monolithic optical structure and the lead fiber 20 can utilize other methods as well. The configuration shown in FIG. 2 may be designed to provide various optical properties as already described in the case of the previous embodiments. The selection of dimensions and preferred dimension ranges are the same as in the case of the embodiments previously described.

Figure 7A:
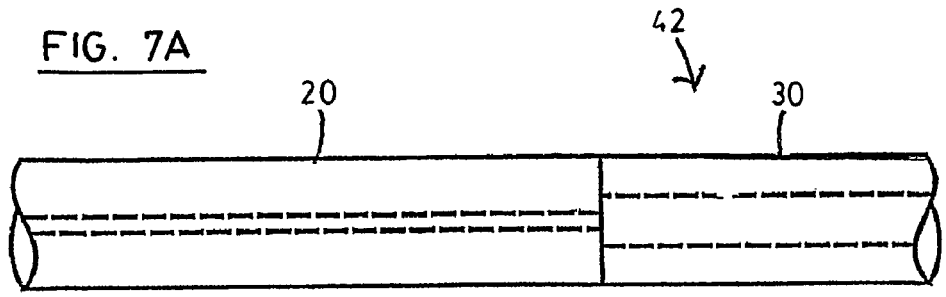
FIGS. 7A to 7C illustrate the steps of a method which may be used to fabricate the optical assembly shown in FIG. 3, according to a preferred embodiment of the invention.
Figure 7B:
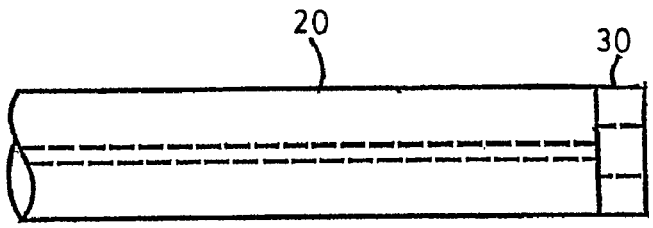
Figure 7C:
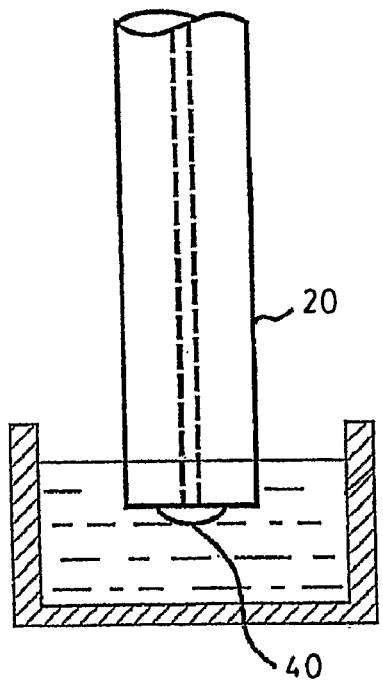

Yet another embodiment of a manufacturing method according to the present invention is shown in FIGS. 7A to 7C. In this case, the optical structure includes only the lens element 30. The resulting microlens 40 is therefore formed directly at the end of the lead fiber 20. The method of FIGS. 7A to 7C is therefore identical to that of FIGS. 6A to 6C with the exception that the length of the optical structure 42 is adjusted shorter so as to leave no spacer portion between the microlens 40 and the lead fiber 20.

Figure 3:
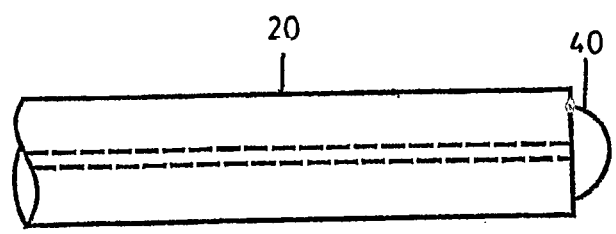
FIG. 3 is a schematical side view of an optical assembly according to a third preferred embodiment of the invention, the assembly including a lead fiber and a microlens.

The resulting assembly of a method according to this embodiment is shown in FIG. 3. It is the simplest design and it consists of a lead optical fiber 20 and a microlens 40. The microlens 40 is preferably made of composite glass having a variable radial distribution of dopants and is preferably fusion spliced to the lead fiber 20. The adjustment of the microlens length, diameter and shape allows tuning of different optical functions; however those functions are limited when compared to the previous designs, due to the absence of positioning capability between the microlens and tip of the lead fiber. For example, this design can be used to improve the coupling efficiency between the fiber and a source but in most cases it can not perform efficient light collimation.

Figure 4:
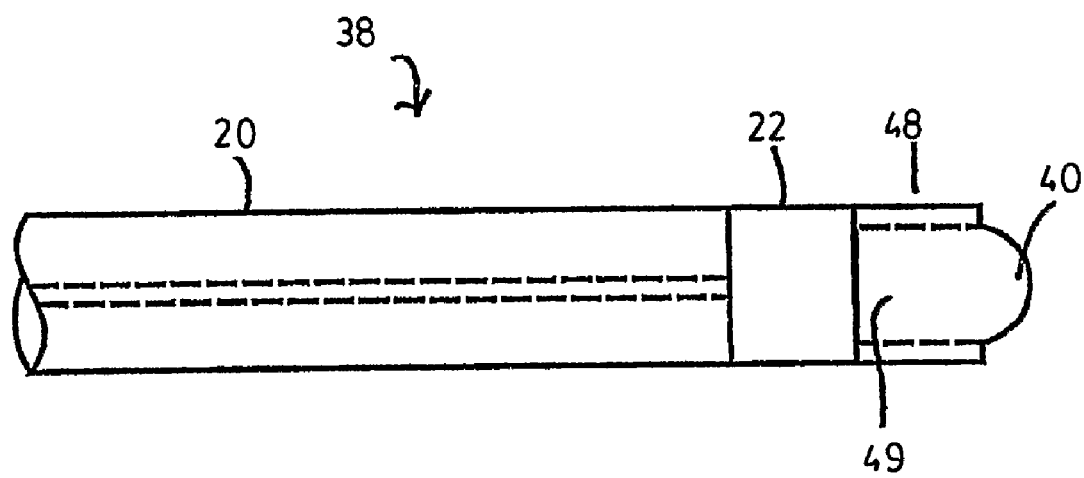
FIG. 4 is a schematical side view of an optical assembly according to a fourth preferred embodiment, the assembly including a lead fiber, a spacer and a monolithic structure defining a spacer and a microlens.

Different combinations of the embodiments described above are possible. An example of such a combination is shown in FIG. 4, which illustrates a light coupling assembly 38 including a lead fiber 20, a spacer element 22 and a monolithic structure 48 including an additional spacer 49 and a microlens 40. The first described fabrication method could be used to produce this fourth preferred embodiment as shown in FIG. 5. The remarks mentioned for the previous fabrication methods apply for this design. The main advantage of this design is the better flexibility concerning the optical design of the spacer since a dual spacer is indeed fabricated.

Figure 9:
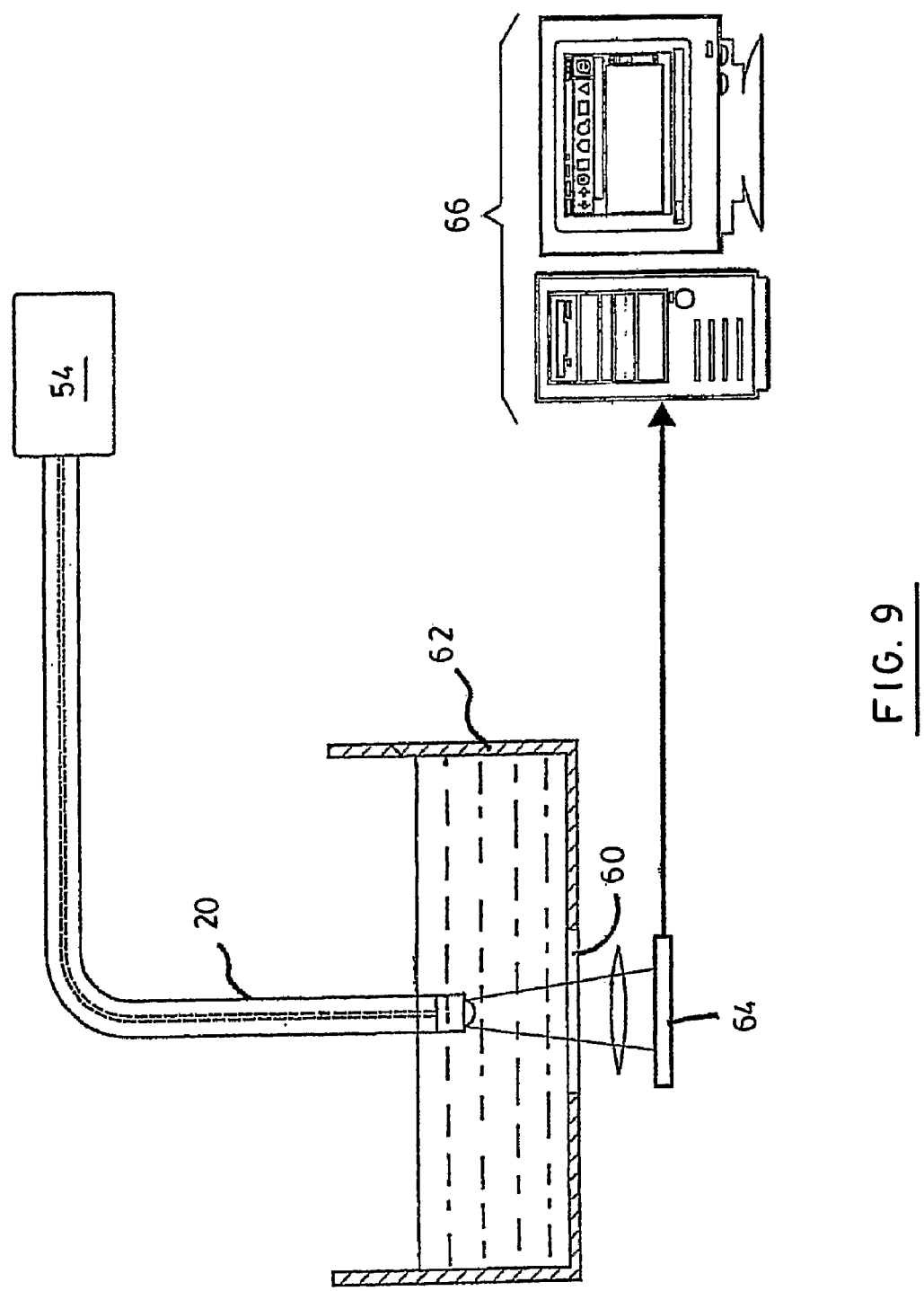
FIG. 9 illustrates an experimental setup which may optionally be used for on-line control of the etching process in any of the methods of the present invention.

All of the manufacturing methods disclosed above may be further improved with on-line control of the microlens shape through the on-line observation of a radiation pattern during etching. An example of such an on-line observation embodiment is shown in FIG. 9. The lead fiber 20 is connected to an appropriate light source 54. The output optical field pattern is on-line observed through the window 60 of the etching vessel 62 by a charge coupled device 64, vidicon, single or multiple detectors or other single or multipoint, linear or spatial optical detectors, that could also simply be a screen. During the etching the radiation pattern changes as etching process reshapes the assembly tip. The data from the spatial detector is analyzed by an appropriate system 66 and when desired shape of the output pattern is achieved, the microlens assembly is removed from the etching agent and neutralized. When good repeatability of starting parameters before etching are achieved, the etching can be performed in batches while only one or few optical fibers are observed on-line. This can significantly reduce the production cost while assuring high repeatability of the process.

Advantageously for all disclosed manufacturing methods, the lead fiber and if present the spacer, could be coated with protective coatings such as but not limited to polymeric resins that will resist to the etching step and that could be finally removed at the end, for instance using organic solvents. Such optional protection layer preferably applied just before chemical etching offers a better protection of assembly elements and allows a better design flexibility.

All presented microlenses and microlens assemblies can advantageously be coated with single- or multi-layer coatings to reduce back reflection which could be useful for most applications where low energy loss is required. In addition, when application requires it such as the case for some sensor applications, the presented microlenses and microlens assembly can be coated with coating that increase or reduce reflectivity. Various metallic thin films, such as gold or chromium or the like could be used. Alternatively, dielectric materials such as oxides like $SiO_2$, $TiO_2$, $ZrO_2$, $Ta_2O_5$ etc could be deposited in single or multiple layers to obtain the required optical performances. Other alternate coatings such as the one known in the art could also be used.

It will be noted that contrary to the teachings of the prior art, the present invention provides light coupling assemblies having a residual radial distribution of dopants therein which is generally continuous, that is that it does not have any sharp discontinuities therein such as is the case in the technique of the previously cited paper by Eisenstein and Vitello. This results from the fact that the distribution of dopants in the microlens is independent from the distribution of dopants in the lead fiber. As the dopant distribution profile determined the refractive index profile, this independence can be used to custom-design the refractive index profile in the microlens, as described above.

One very important advantage of the present invention is the versatility it provides in microlens design. Any of the methods disclosed above and variants thereof may be used to manufacture a microlens of basically any desired profile at the extremity of a lead fiber. Referring to FIGS. 10A to 15, a variety of such designs are shown. The list presented here is of course non-exhaustive.

Figure 10A:
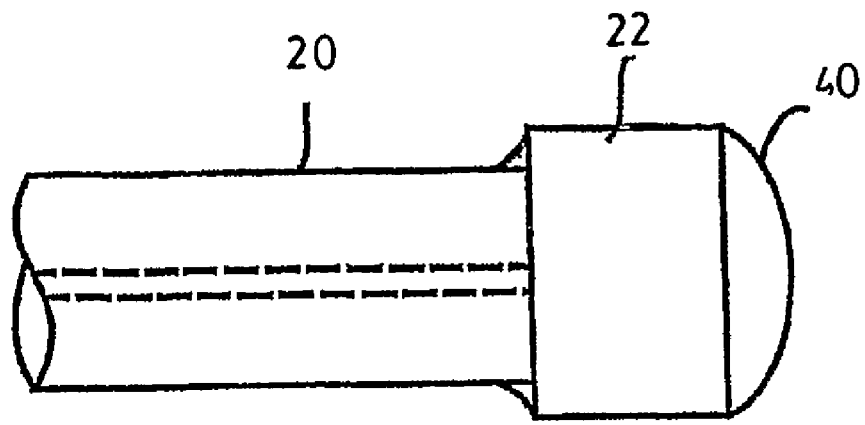
FIGS. 10A to 10C show examples of embodiments of the optical assembly where the microlens diameter is equal or larger than lead fiber diameter.
Figure 10B:
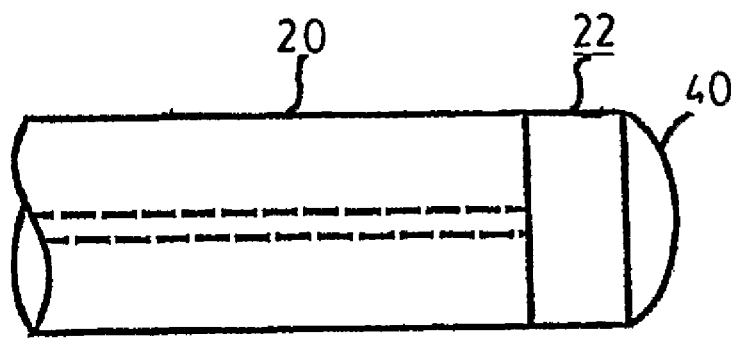
Figure 10C:
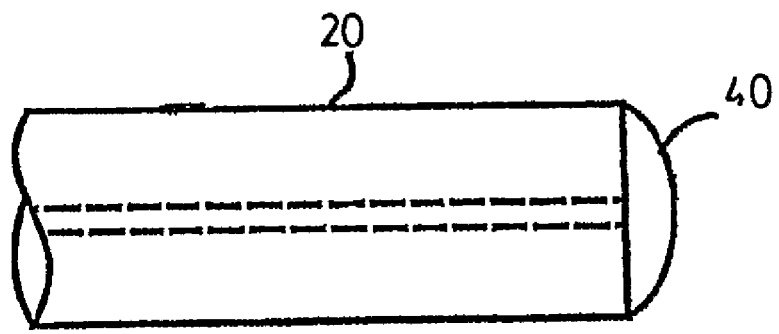

FIGS. 10A to 10C show cases where the microlens 40 has a diameter larger or equal to the lead fiber 20 diameter, and is attached to the lead fiber 20 through or without a spacer 22. Larger microlens diameter might be advantageous for applications like, but not limited to, collimating, due to the lower beam divergence diffraction limit. In FIG. 10A the spacer has a larger diameter than the one of the lead fiber and the microlens has the same diameter than the spacer. In that case there may be an area around the different diameters where the fusion splice creates a transition surface. In FIGS. 10B and 10C the lead fiber, the spacer and the microlens have the same diameter.

Figure 11A:
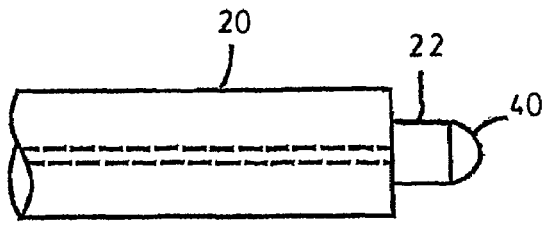
FIGS. 11A to 11C show examples of embodiments of the optical assembly where specially shaped microlenses are created at the tip of a fiber.
Figure 11B:
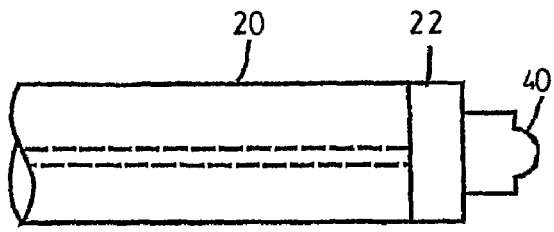
Figure 11C:
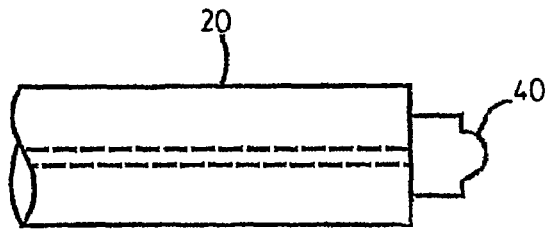
Figure 12A:
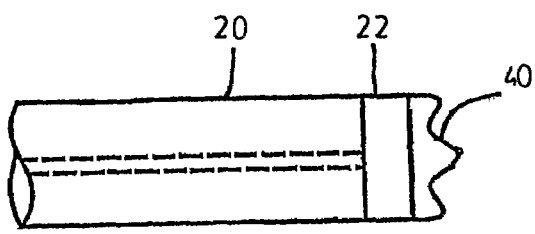
FIGS. 12A and 12B show examples of preferred embodiments with concave microlenses.
Figure 12B:
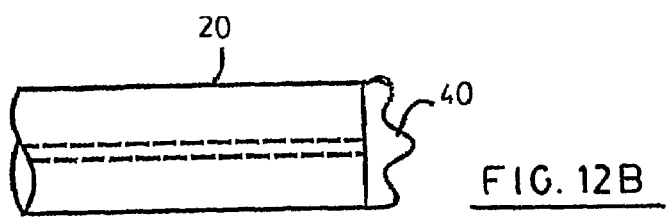

Other possible arbitrary shapes of the microlens 40 are illustrated in FIGS. 11A to 11C, in different cofigurations of lead fiber 20 and spacer 22. Possible interesting shapes could be parabolic, hyperbolic, conical, (for instance using additional optional partial polishing of the microlens surface) and the like. Truncations of any of these shapes may also be obtained. None of the methods disclosed in the prior art even come close to such being so versatile. For example, the technique disclosed in the above cited paper by Eisenstein and Vitello is limited to the shown conical shape as the microlens profile is determined by the pre-existing dopant profile in the lead fiber versatility of shape is crucial as the optical properties of the resulting assembly, such as coupling efficiency strongly depend on the shape of the microlens (Vassallo C. and Michiel van der Keur J. Electron. Lett. (1992) Vol. 28 n°20, pp. 1913 1915 "Ultimate coupling performances for microlensed fibres"; Edwards C. A. et al. J. Lightwave Tech. (1993) Vol. 11 n°2, pp. 252 257 "Ideal microlenses for laser to fiber coupling"; and John J. et al. IEE Proc.-Optoelectron. (1994) Vol. 141 n°3, pp. 178 184 "Matching of single-mode fibre to laser diode by microlenses at 1.5 µm wavelength"). As already mentioned in the disclosed methods, the final shape of the microlens surface mostly depends on the dopants profile that is used in the doped fiber that offers a great flexibility in final microlens design. Plano-concave microlenses 40 can also be created directly at the tip of the fiber 20 with or without a spacer 22 as shown in FIGS. 12A and 12B, respectively. Such plano-concave microlens designs could advantageously be used when diverging optics is needed. The disclosed method using chemical etching to shape the microlens profile is a unique method that is able to produce easily concave microlenses since almost most other methods involving for instance shaping with heat create usually convex profiles due to mechanical properties associated with surface tensions properties of the liquefied glass microlens. Even precise micromachining with $CO_2$ laser (Presby H. M. et al. Appl. Opt. (1990) Vol. 29 n°18, pp. 2692 2695 "Laser micromachining of efficient fiber microlenses") that allows one of the best controls on microlens profile will not be very suitable for concave microlens designs. All different versions using spacer, monolithic structure design of spacer and microlens or only microlens can have concave microlens profile. In such cases the radial distribution of dopants in etched fiber and etching agent needs to be such to provide faster recess of the etched fiber or solid rod center than of the outer most areas. For example, typically if $GeO_2$ doping is used with its concentration highest in the center of the fiber or doped rod, the etching in HF will provide the fastest recess of the central region. It is also worth mentioning that if an appropriate mirror or coating is used, such concave microlens design could also be used as concave micro-optical device such as for instance parabolic micro-mirror.

Figure 13A:
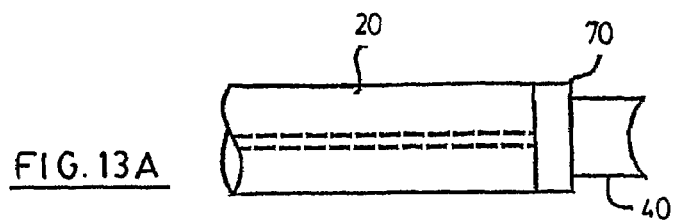
FIGS. 13A and 13B show examples of preferred embodiments where a spacer and a microlens define a shoulder that could be used for fine positioning in an assembly.
Figure 13B:
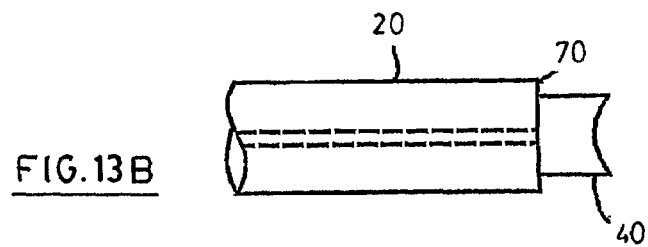
Figure 14:
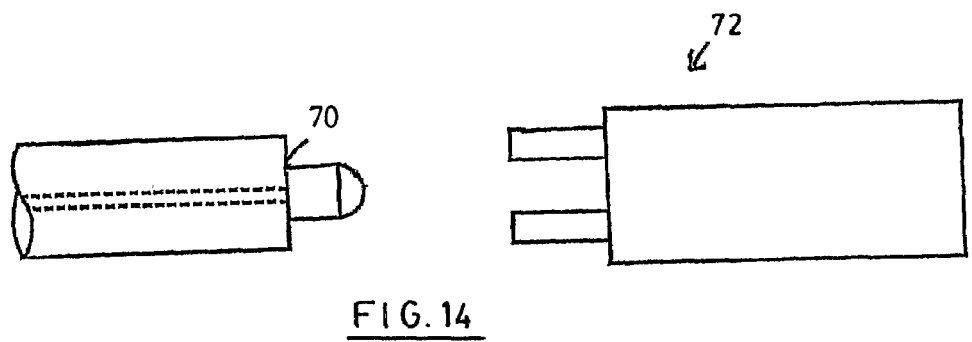
FIG. 14 illustrates how the shoulder of the embodiment of FIG. 13 could be used for fine positioning and alignment purposes in an assembly.

It is worth mentioning that the present invention also allows also creating an optional shoulder 70 in the design of the assembly such as shown in FIGS. 13A and 13B. Such a shoulder could advantageously be used to help for the precise positioning of the fiber 20 terminated with the microlens 40 into more complex optical assembly 72 such as illustrated in FIG. 14. The shoulder 70 can be used to provide a surface stopper for a precise alignment of the microlens 40 with other optical elements such as capillary tube or a positioning structure created in a silicon chip (with for instance comprising a light source or light detector) where the optical fiber with microlens should be connected. Such positioning structure could simply be a V groove such as easily performed by anisotropic etching of silicon, or more complex structure. Interestingly there are two approaches to create a design with positioning shoulder. The first approach would consist in splicing spacer or doped fiber with smaller diameter than the lead fiber. Depending on the two diameter differences such approach may not be suitable either for good splicing or for good shoulder surface definition. In such cases another approach could alternatively be used. It consists of splicing fibers with similar diameters and further reducing spacer or doped fiber diameter using appropriate chemical etching. An additional external etchable cladding could advantageously be used for such purpose. Double or multiple cladding structures could be used for accurate dimensional control. It is worth mentioning that the external cladding etching could be performed during the same or during a different etching step than the one used for shaping the microlens from the doped fiber.

Figure 15:
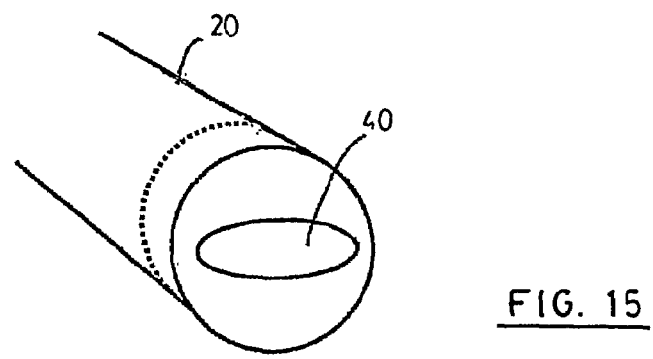
FIG. 15 is a schematic perspective view of an elliptical microlens assembly at the tip of a fiber.

FIG. 15 shows a microlens assembly including an elliptical microlens 40 that can be obtained by radial non symmetric doping of the fiber that is etched into the elliptical microlens. Such design could advantageously be used for instance to transform the output light from the lead fiber 20 from an usually circular pattern into an elliptic or more linear pattern that could thus be better distributed onto a linear light detector such as for instance linear charge coupling devices (CCD). Alternatively, such design could also advantageously be used to correct for the ellipticity of a non symmetrical beam and to improve the coupling of light into the lead fiber of a non circular light source such as the strongly astigmatic beam emerging from a junction semiconductor laser typically used in telecommunications. Such advantage will be of particular interest when the lead fiber is a single-mode fiber as usually the case in this market. The well controlled positioning of such non circular microlens relative to the fiber core center is also perfectly achieved with the fabrication methods described previously which is in that case probably more critical.

Of course, numerous modifications could be made to the embodiments described above without departing from the scope of the present invention as defined in the appended claims.

The invention claimed is:

1. A method for manufacturing a microlens having a desired shape at an extremity of a lead waveguide, the method comprising the steps of:
   a) positioning a first end of an elongated optical structure in end to end alignment with the extremity of the lead waveguide, said optical structure having a second end opposite said first end, said second end having a radially non-uniform etchability profile selected to define said desired shape;

b) permanently joining the first end of the optical structure to said extremity of the waveguide; and c) processing the second end of the optical structure to obtain said microlens, said processing comprising the substeps of:
   i. adjusting a length of said optical structure; and
   ii. etching said second end of the optical structure to obtain said desired shape.

2. The method according to claim 1, wherein said optical structure comprises a spacer portion at said first end and a lens portion at said second end.

3. The method according to claim 2, wherein said spacer and lens portions form a monolithic block.

4. The method according to claim 2, comprising an additional step before step a) of manufacturing said optical structure, said additional step comprising the substeps of:
   i. positioning a spacer element in end to end alignment with a lens element, said lens element being provided with said etchability profile;
   ii. permanently joining said lens element to said spacer element; and
   iii. adjusting a length of said spacer element.

5. The method according to claim 4, wherein said lens element comprises a spacer sub-portion at said first end and a lens sub-portion at said second end, said spacer and lens sub-portions forming a monolithic block.

6. The method according to claim 1, wherein the microlens obtained by the processing of step c) is contiguous to the extremity of the lead waveguide.

7. The method according to claim 4, wherein said spacer element is made of a material selected from the group consisting of pure silica glass and composite glass.

8. The method according to claim 1 wherein at least the second end of the optical structure is made of composite glass having at least one type of dopants therein, said dopants having a radial distribution profile defining said non-uniform etchability profile.

9. The method according to claim 8, wherein said radial distribution profile of dopants has a maximum at a center of said second end of the optical structure and decreases towards sides thereof.

10. The method according to claim 8, wherein said radial distribution profile of dopants has a minimum at a center of said second end of the optical structure and increases towards sides thereof.

11. The method according to claim 8, wherein at least one of the at least one type of dopants increases a refractive index in said second end of the optical structure.

12. The method according to claim 8, wherein at least one of the at least one type of dopants decreases a refractive index in said second end of the optical structure.

13. The method according to claim 8, wherein at least two of said at least one type of dopants and the radial distribution thereof are selected to provide a predetermined refractive index profile across said second end of the optical structure.

14. The method according to claim 8, wherein at least two of said at least one type of dopants and the radial distribution thereof are selected to provide a uniform refractive index throughout said second end of the optical structure.

15. The method according to claim 1, wherein said lead waveguide is an optical fiber.

16. The method according to claim 1, wherein the permanent joining of step b) comprises fusion splicing said first end of the optical structure to said extremity of the lead waveguide.

17. The method according to claim 4, wherein the permanent joining of substep a) ii comprises fusion splicing said lens element to said spacer element.

18. The method according to claim 1, wherein the adjusting of substep c) i. comprises using at least one of the techniques selected from the group consisting of cleaving and polishing said second end of the optical structure.

19. The method according to claim 4, wherein the adjusting of substep a) iii. comprises using at least one of the techniques selected from the group consisting of cleaving and polishing said spacer element.

20. The method according to claim 1, wherein step c) comprises and additional substep iii. of finishing a surface of said microlens.

21. The method according to claim 1, wherein step c) ii. further comprises propagating a light beam through said lead waveguide towards said optical structure, monitoring light outputted from said optical structure and controlling said etching based on said monitoring.

22. The method according to claim 1, wherein step c) ii. further comprises also etching an outer surface of the spacer portion to reduce a diameter thereof to a size smaller than a diameter of the lead waveguide.

23. The method according to claim 1, wherein said etchability profile of the second end of the optical structure is designed so that said desired shape of the microlens is selected from the group comprising of spherical, elliptic, conical, trapezoidal, parabolic, and hyperbolic profiles and truncations thereof.

24. A method for manufacturing a microlens having a desired shape at an extremity of a lead waveguide, the method comprising the steps of:
   a) positioning a first end of an elongated spacer element in end to end alignment with the extremity of the lead waveguide;
   b) permanently joining the first end of the spacer element to said extremity of the waveguide;
   c) processing a second end of the spacer element opposite the first end to adjust a length thereof;
   d) positioning a first end of an elongated lens element in end to end alignment with the second end of the spacer element, said lens element having a second end opposite the first end, said second end having a radially non-uniform etchability profile selected to define said desired shape;
   e) permanently joining the first end of the lens element to said second end of the spacer element; and
   f) processing the second end of the lens element to obtain said microlens, said processing comprising the substeps of:
      i. adjusting a length of said lens element; and
      ii. etching said second end of the lens element to obtain said desired shape.

25. The method according to claim 24, wherein said lens element comprises a spacer sub-portion at said first end and a lens sub-portion at said second end, said spacer and lens portions forming a monolithic block.

26. The method according to claim 25, wherein the lens element is made of composite glass having at least one type of dopants therein, said dopants having a radial distribution profile defining said non-uniform etchability profile.

27. The method according to claim 24, wherein said spacer element is made of a material selected from the group consisting of pure silica glass and composite glass.

28. The method according to claim 24, wherein the lens element is made of composite glass having at least one type of dopants therein, said dopants having a radial distribution profile defining said non-uniform etchability profile.

29. The method according to claim 28, wherein said radial distribution profile of dopants has a maximum at a center of said lens element and decreases towards sides thereof.

30. The method according to claim 28, wherein said radial distribution profile of dopants has a minimum at a center of said lens element and increases towards sides thereof.

31. The method according to claim 28, wherein at least one of the at least one type of dopants increases a refractive index in said lens element.

32. The method according to claim 28, wherein at least one of the at least one type of dopants decreases a refractive index in said lens element.

33. The method according to claim 28, wherein at least two of said at least one type of dopants and the radial distribution thereof are selected to provide a predetermined refractive index profile across said lens element.

34. The method according to claim 28, wherein at least two of said at least one type of dopants and the radial distribution thereof are selected to provide a uniform refractive index throughout said lens element.

35. The method according to claim 24, wherein said lead waveguide and said lens element are optical fibers.

36. The method according to claim 24, wherein said spacer element is a glass rod.

37. The method according to claim 24, wherein the permanent joining of step b) comprises fusion splicing said first end of the spacer element to said extremity of the waveguide.

38. The method according to claim 24, wherein the permanent joining of step e) comprises fusion splicing said first end of the lens element to said second end of the spacer element.

39. The method according to claim 24, wherein the processing of step c) comprises using at least one of the techniques selected from the group consisting of cleaving and polishing said second end of the spacer element.

40. The method according to claim 24, wherein the adjusting of substep f) i. comprises using at least one of the techniques selected from the group consisting of cleaving and polishing said second end of the lens element.

41. The method according to claim 24, wherein step f) comprises and additional substep iii. of finishing a surface of said microlens.

42. The method according to claim 24, wherein step f) ii. further comprises propagating a light beam through said lead waveguide towards said optical structure, monitoring light outputted from said optical structure and controlling said etching based on said monitoring.

43. The method according to claim 24, wherein step f) ii. further comprises also etching an outer surface of the spacer element to reduce a width thereof to a size smaller than a width of the lead waveguide.

44. The method according to claim 24, wherein said etchability profile of the second end of the lens element is designed so that said desired shape of the microlens is selected from the group comprising or spherical, elliptic, conical, trapezoidal, parabolic, and hyperbolic profiles and truncations thereof.

45. A light coupling assembly, comprising:
a lead waveguide having a coupling extremity;
an optical structure having opposite first and second ends, the first end being permanently joined to the coupling extremity of the waveguide, and the second end being shaped as a microlens of a generally continuous profile, said second end having a radial distribution of dopants therein following a generally continuous gradient profile.

46. The light coupling assembly according to claim 45, wherein said dopants generate a generally continuous refractive index radial gradient in said second end of the optical structure.

47. The light coupling assembly of claim 45, wherein said optical structure comprises a spacer portion at said first end and a lens portion at said second end.

48. The light coupling assembly according to claim 47, wherein said spacer and lens portions form a monolithic block.

49. The light coupling assembly according to claim 47, wherein said spacer portion is defined by a spacer element permanently joined to a lens element, said lens element defining said lens portion.

50. The light coupling assembly according to claim 49, wherein said spacer element is a glass rod.

51. The light coupling assembly according to claim 49, wherein said spacer is element is made of a material selected from the group consisting of pure silica glass and composite glass.

52. The light coupling assembly according to claim 49, wherein said spacer element has non-homogenous optical properties along at least one of a longitudinal direction and a radial direction.

53. The light coupling assembly according to claim 45, wherein said dopants are selected to increase a refractive index of the second end of the optical structure.

54. The light coupling assembly according to claim 45, wherein said dopants are selected to decrease a refractive index of the second end of the optical structure.

55. The light coupling assembly according to claim 45, wherein said dopants are of at least two different types, said types and the radial distribution of said dopants being selected to provide a predetermined refractive index profile in said microlens.

56. The light coupling assembly according to claim 45, wherein said profile of the microlens is symmetrical with respect to a longitudinal axis of said assembly.

57. The light coupling assembly according to claim 45, wherein said profile of the microlens is asymmetrical with respect to a longitudinal axis of said assembly.

58. The light coupling assembly according to claim 45, wherein said profile of the microlens is selected from the group comprising or spherical, elliptic, conical, trapezoidal, parabolic, and hyperbolic profiles and truncations thereof.

59. The light coupling assembly according to claim 45, wherein said microlens is plano-convex.

60. The light coupling assembly according to claim 45, wherein said microlens is plano-concave.

61. The light coupling assembly according to claim 45, wherein said optical structure has a diameter larger than a diameter of the lead waveguide.

62. The light coupling assembly according to claim 45, wherein said optical structure has a diameter substantially equal to a diameter of the lead waveguide.

63. The light coupling assembly according to claim 45, wherein said optical structure has a diameter smaller than a diameter of the lead waveguide.

64. The light coupling assembly according to claim 45, wherein said optical structure has a diameter larger than a diameter of a core of the lead waveguide.

* * * * *